United States Patent [19]

Adkins

[11] Patent Number: 5,475,673
[45] Date of Patent: Dec. 12, 1995

[54] OPTICAL RECORDING MEDIUM FOR USE WITH A LASER RECORDING BEAM

[75] Inventor: Kelvin P. Adkins, Elmstead Market, England

[73] Assignee: Imperial Chemical Industries plc, London, England

[21] Appl. No.: 190,178

[22] PCT Filed: Jul. 7, 1993

[86] PCT No.: PCT/GB93/01201

§ 371 Date: May 13, 1994

§ 102(e) Date: May 13, 1994

[87] PCT Pub. No.: WO93/26002

PCT Pub. Date: Dec. 23, 1993

[30] Foreign Application Priority Data

Jun. 8, 1992 [FR] France .................................. 92 305216
Dec. 16, 1992 [GB] United Kingdom .................... 9226180

[51] Int. Cl.⁶ .............................. G11B 3/70; G11B 5/84; G11B 7/26
[52] U.S. Cl. ............................................ 369/286; 369/283
[58] Field of Search .................................... 369/286, 283, 369/95; 360/95

[56] References Cited

U.S. PATENT DOCUMENTS 4,673,602   6/1987   Nakayama et al. ................. 428/65
5,268,211  12/1993   Soga et al. ........................... 428/64
5,331,625   7/1994   Mieda et al. ..................... 369/275.1
5,382,463   1/1995   Adkins et al. ....................... 428/141

FOREIGN PATENT DOCUMENTS 164727  12/1985   European Pat. Off. .

OTHER PUBLICATIONS

Database WPIL, Week 9325, Derwent Publications Ltd., AN 93-201567 May 25, 1993.
Patent Abstracts of Japan, vol. 7, No. 253, Nov. 1983, JP 58 137 149.
Patent Abstracts of Japan, vol. 15, No. 466, Nov. 1991, JP 31 98 232.
Patent Abstracts of Japan, vol. 10, No. 284, Sep. 1986, JP 61 104 441.

Primary Examiner—John H. Wolff
Assistant Examiner—Adriana Giordana
Attorney, Agent, or Firm—Cushman Darby & Cushman

[57] ABSTRACT

Recording media having a back coat and a recording layer on opposite sides of a substrate and a super coat adsorbed onto the back coat and/or the recording layer are disclosed. The super coat suitably has a low surface energy. Such media are particularly useful in optical recording applications where the media are in tape form and stored on spools.

6 Claims, 2 Drawing Sheets

OPTICAL RECORDING MEDIUM FOR USE WITH A LASER RECORDING BEAM

RECORDING MEDIA

This invention relates to recording media in particular to recording media of the type produced in the form of a tape which can be wound onto a spool and from which it can subsequently be unwound.

Such media in general comprise a polymeric substrate having on one side a layer of recording material, for example a magnetic, magneto-optical or optical recording material and, typically, on the other side, a back coat to import desirable characteristics for example good handling and frictional properties.

In magnetic media applications, it is known to apply a super coat to the back coat and/or recording layer to provide for improved wear resistance and other desirable characteristics. For example, magnetic recording media comprising a back coat may have a lubricating layer topically provided on the back coat which is not bound to the back coat and which may readily transfer to the recording layer for example when the media is in tape form and wound onto a spool.

Hitherto, optical recording media, especially in tape form having a super coat one the back coat of the media have not been disclosed.

The Invention provides an optical recording medium for use with a laser recording beam of a given wavelength comprising a substrate having on its obverse side a recording layer which is capable of absorbing radiation of said given wavelength, a back coat on its reverse side and a super coat on the back coat.

When recording media in tape form tape is wound onto a spool the obverse and reverse sides of the media come into contact. In such winding operations it is usually necessary to wind the tape tightly to reduce the possibility of undesirable lateral slippage between winds of the tape this effect may be referred to as "stepping". "Stepping" may occur for several reasons including shock loads and/or temperature variation during transport or tape relaxation during storage. As a result of such winding, high compressive forces may exist and cause undesirable adhesion between the adjacent obverse (recording layer side) and reverse side (back coat side) of the recording media.

Where such adhesion occurs, areas of one of the adjacent layers may remain adhered to the other layer upon unwinding the tape and thereby transfer to the other layer.

Furthermore problems due to unwanted transfer of material, during winding, to hardware components, for example transport rollers may also occur. Such unwanted transfer may also occur in media in a form other than tape where the obverse and reverse sides of the media are in contact, for example when media are stacked.

We have found that by providing on at least one of the back coat or the recording layer of the recording media, a super coat which is adsorbed onto the underlying layer, problems associated with non-bonded coatings, for example lubricant layers in magnetic media, including unwanted transfer and migration of one layer to another may be reduced.

According to the present invention there is provided a recording medium comprising a substrate having on its obverse side a recording layer and on its reverse side, a back coat at least one of which layers is an underlying layer to a super coat, and a super coat on at least one side of the medium wherein the super coat is adsorbed onto the underlying layer.

The underlying layer may be the recording layer, the back coat layer or, in cases where the recording layer and back coat layer have a super coat, both.

By adsorbed we mean chemi-sorbed and/or physi-sorbed wherein the super coat is bonded, desirably chemically, to the underlying layer to increase the strength of the bond between the super coat and the underlying layer as compared with a super coat which is deposited on an underlying layer without any significant adsorption. Suitably, adsorption of the super coat provides a heat of adsorption which is greater in magnitude than any heat evolved by deposition of a super coat in which no significant adsorption to the underlying layer occurs.

The adsorbed super coat reduces the possibility of unwanted transfer of part of the super coat to the opposite side of the media due to adhesion between the two sides of the media by providing an increased bond strength between the super coat and the underlying layer which is less likely to fracture if adhesion between the opposite sides of media occurs. Additionally, undesirable transfer of material from the super coat to hardware components during use may be reduced. A significant, practical benefit is that the archive stability is significantly enhanced and improved wear resistance and friction characteristics may be secured.

Further, we have found that by providing a super coat which also has a low surface energy, problems due to unwanted adhesion between the opposite sides of the media may be ameliorated.

Accordingly a further aspect of the invention provides a recording medium comprising a substrate having on its obverse side a recording layer, on its reverse side, a back coat layer at least one of which layers is an underlying layer to a super coat, and on at least one side of the medium a super coat having a surface energy of not more than 44 dyne per centimetre (dyne/cm) wherein the super coat is adsorbed onto the underlying layer.

Surface energy is determined in accordance with ASTM Test No. D2578-67.

Desirably, the surface energy of the back coat is not more than 38 dyne/cm, preferably not more than 32 dyne/cm.

Suitably, the surface energy of the super coat is as low as possible to reduce the possibility of adherence whilst recognizing the desirability for the super coat also to possess other properties. The super coat is therefore suitably selected to provide an optimum combination of properties.

It is believed that the lowest surface energy achievable is about 6 dyne/cm and may be provided by polymeric materials which present -$CF_3$ moieties to the surface. The minimum surface energy for a super coat on media according to the present invention is not critical but is in any case limited by what is practically achievable.

The reduced surface energy of the super coat is advantageous in that the possibility of adhesion between the adjacent recording and super coat layers, and therefore unwanted transfer of material, is reduced.

The combination of the low surface energy of the super coat and its adsorption to the underlying layer provide excellent resistance to unwanted transfer. The low surface energy reduces the possibility that any adherence between the super coat and the opposite side of the media will occur and, in the event that there is such adherence, the adsorbed nature of the super coat provides for greater resistance to the super coat being removed from the underlying layer.

Preferably the super coat is bonded to the underlying layer by covalent bonds or hydrogen bonds between functional groups on the super coat and the underlying layer, for example to form a covalent and/or hydrogen bonded cross-linking structure between the super coat and the underlying layer. Thus, the underlying layer suitably has free functional groups which may combine with free functional groups in the super coat during and/or subsequent to formation of the super coat.

Accordingly a further aspect of the invention provides a recording medium comprising a substrate having on its obverse side a recording layer and on the reverse side a back coat layer, at least one of which layers is the underlying layer of a super coat, and a super coat on at least one side of the medium wherein the underlying layer comprises a material having free functional groups and the super coat is formed on the underlying layer from a composition comprising a material, which is to form the super coat, having free functional groups which groups are compatible with at least some of those of the underlying layer, wherein, upon or subsequent to formation of the super coat, at least some of the free functional groups of the underlying layer and super coat combine whereby the super coat is adsorbed onto the underlying layer.

The term "free functional group" includes functional groups which may be rendered free as a result of a treatment applied during or subsequent to formation of the super coat on the underlying layer for example by abstraction of a moiety such as hydrogen from the functional group using a high energy process for example, plasma deposition or electron beam curing.

The specific nature of the free functional groups is not in itself critical provided that there is compatibility between the free functional groups of the underlying layer and the super coat, for example the groups can form covalent and/or hydrogen bonds. Preferably the free functional groups of the super coat and the underlying layer are the same, suitable examples of such groups include acrylate groups, methacrylate groups, hydroxyl groups and methylol groups.

Another aspect of the invention provides a method of producing a recording medium which comprises providing a base medium comprising a substrate having on its obverse side a recording layer and on the reverse side a back coat layer, applying to at least one of said layers a composition comprising a super coat material having free functional groups to form a super coat wherein the layer to which said composition is applied comprises a material having free functional groups which are compatible with the functional groups of the super coat material, and effecting curing of the super coat to form an adsorbed super coat on the said base medium.

The super coat preferably comprises a low surface energy material comprising a monomer, oligomer or pre-polymer moiety which is suitably substantially non polar for example dialkyl siloxane and perfluoroalkyl, and a free functional group for example acrylate and groups having an abstractable hydrogen atom, which is capable of bonding with free functional groups in the underlying layer and, desirably, radiation or thermally curable. The super coat is suitably selected having regard to the material of the underlying layer due to the requirement that the super coat be adsorbed.

Suitable super coat materials include perhalopolyether acrylates, for example perfluoropolyether acrylates: perhalohydrocarbyl acrylates preferably perhaloalkyl acrylates for example perfluoroalkyl acrylates: 2,2,3,3 tetrafluoropropylmethacrylate available from Rohm GmbH: silicone acrylates for example TEGOMER RC726 from T H Goldschmidt and EBECRYL 1360 from Union Carbide: and methacrylate analogues of such acrylates.

Other materials may be present in the super coat as desired, including organic monomers which may be polymerised with the low surface energy material to provide a copolymeric super coat provided free functional groups are available for combining with those of the underlying layer. Suitable monomers may have similar functional groups but not necessarily the same non polar moieties as the low surface energy material for example urethane acrylates and acrylate esters. Other organic materials which do not combine with the low surface energy material for example amorphous polyesters may be employed as desired.

The thickness of the super coat will depend upon the application for which the medium is produced but, for optical recording tape applications is preferably up to 2 μm and especially 1nm to 0.5 μm. It is particularly preferred that the super coat comprises a very thin layer, preferably a manolayer, of material which is adsorbed onto the underlying layer. By monolayer we mean a layer of material which is about one molecule thick, and which provides for a super coat having a greater proportion of its functional groups bonded to those of the underlying layer.

The composition comprising the super coat material may conveniently be applied to the substrate in a coating medium comprising a solution or dispersion of the said material in a suitable volatile vehicle, particularly an organic solvent or diapersant medium. The volatile vehicle may then be removed, suitably by drying to evaporate the vehicle.

Suitable organic media include common solvents—for example methylethyl ketone, acetone and tetrahydrofuran.

Deposition of the super coat onto the underlying layer may be effected by conventional film coating techniques—for example, by gravure roll coating, reverse roll coating, dip coating, bead coating, slot coating or electrostatic spray coating. Other techniques may be employed if desired for example, plasma deposition.

Following deposition of the super coat, it is desirable to cure it in order to effect adsorption of the super coat onto the underlying layer. Suitable curing methods include inducing polymerisation, for example by electron beam curing, thermal curing or photopolymerisation.

Photopolymerisation is suitably achieved by exposing the super coat to high intensity ultra-violet (UP) light, for example using a mercury arc lamp, preferably a medium pressure mercury arc lamp, providing UV light having a wavelength of about 240 to about 370 nm and preferably 260 to 370 nm. UP-curing can be performed in air, or if required, for example to increase the curing rate, in an inert atmosphere such as nitrogen.

Initiation of photopolymerisation may be effected in the presence of a photoinitiator, wide range of which are commercially available. The photoinitiator may be incorporated in the composition comprising the super cost material or, if desired, be present in the underlying layer. Suitable photoinitiators include benzoins, benzoin alkyl ethers, benzil ketals, acetophenone derivatives, for example dialkyl acetophenones and di-chloro and tri-chloro acetophenones, and particularly IRGACURE 651 and IRGACURE 907 both of which are available from Ciba Geigy.

Adsorption of the super coat on the back coat may be determined by measuring the surface energy of the super coat after it has been contacted with a solvent of the type from which it was deposited onto the underlying layer.

Suitably, the super coat is considered to be adsorbed if there is no significant change in the surface energy before and after contact with the solvent. If parts of the super coat are not adsorbed, contact with the solvent removes the non-adsorbed parts of the super coat and areas of the higher surface energy underlying layer are presented and the surface energy of the media is greater than that prior to removal of the non-adsorbed super coat.

Particularly in the case of optical recording media, conventional media have been found to be unsatisfactory as regards undesirable transfer of material between the obverse and reverse sides of the media.

In optical recording, data is stored in optical recording media using a laser beam, focused for example to a spot size of about 1 μm or less, which interacts with the recording layer of the media which is sensitive to the laser radiation. The recording may be effected in various ways, for example by laser light induced deformation or ablation of the recording layer or by laser induced phase changes in the recording layer material, for example between amorphous and crystalline.

It is necessary that the recording layer or, if present, its over coat do not have undesirable surface deposits which may adversely interact with the laser radiation employed in writing or reading the media. The possibility of such deposits being present due to adherence between the obverse and reverse sides of the media may be ameliorated by employing a recording medium according to the invention as an optical recording medium.

The invention further provides an optical recording medium for use with a laser recording beam having a given wavelength which comprises a recording medium as described in any previously mentioned aspect of the invention.

Typically optical recording media comprise a protective over coat layer on the recording layer through which the laser recording beam passes during use. Conventionally such over coats desirably provide good wear characteristics and permit the laser beam to pass therethrough to interact with the underlying recording laser and are suitably deposited from a composition which does not significantly modify the recording layer.

As the over coat should desirably possess such properties there may be difficulty in providing an over coat which has these properties and which also fulfils the function of a super coat of reducing the unwanted transfer of material between adjacent layers. Further, in the present invention, it is required that the super coat be adsorbed on the underlying layer, we therefore prefer that the super coat be applied to the back coat of the media rather than the recording layer although, if desired, a super coat may be applied to the recording layer in addition or instead of that applied to the back coat.

The invention further provides an optical recording medium for use with a laser recording beam having a given wavelength which comprises a recording medium as described in any previously mentioned aspect of the invention wherein the super coat is on the back coat layer.

The optical recording medium may be in any form employed in the art: for example in the form of a card medium, hard or floppy disk and tape medium.

The back coat of the recording medium may comprise materials conventionally employed in recording media back coats which have free functional groups, for example (meth) acrylates, epoxy resins, urethanes melamine formaldehydes and urea formaldehydes. Typically, such back coat materials are cured to provide suitable cross-linking and by partly curing such materials, some functional groups may be left unreacted to provide the free functional groups which my then combine with the super coat applied to the back coat.

Preferred back coats are disclosed in our prior application number 92305216.1 the disclosure of which is incorporated herein by reference. Suitably the back coat comprises a metal (meth) aczylate and/or a (meth) acrylate ester polymer. Especially preferred back coats comprise one or more of the following: a metal acrylate or methacrylate, for example zinc diacrylate from Rohm: an oligomeric acrylate thioether, for example PLEX 6696-0 from Rohm; a dipentaerythritol monohydroxypenta acrylate, for example SARTOMER 399 from Sartomer; an isocyanurate triacrylate for example SARTOMER SR368 from Sartomer: an amino acrylate for example UVECRYL P115 from UCB; a difunctional epoxy acrylate oligomer for example EBECRYL 600 from UCB.

The back coat may also comprise other components conventionally employed for example, nucleating agents and polymerisation initiators for example IRGACURE 651 and IRGACURE 907 from Ciba Geigy.

The back coat may be substantially smooth or may have a surface texture which is preferably imparted primarily by the polymer(s) but, if desired may be imparted by a particulate filler in the back coat. In order to retain the benefit of the surface texture of the back coat it is highly desirable that the super coat, if present, follows the contours of the surface of the back coat and is applied in a layer of substantially uniform thickness.

The substrate of the recording media according to the invention may be formed from any synthetic, film-forming polymeric material. Suitable thermoplastics materials include a homopolymer or copolymer of a 1-olefin, such as ethylene, propylene and but-1-ene, a polyamide, a polycarbonate, and, particularly, a synthetic linear polyester which may be obtained by condensing one or more dicarboxylic acids or their lower alkyl (up to 6 carbon atoms) diesters, eg terephthalic acid, isophthalic acid, phthalic acid, 2,5- 2,6- or 2,7- naphthalenedicarborylic acid, succinic acid, sebacic acid, adipic acid, azelaic acid, 4,4'-diphenyldicarboxylic acid, hexahydroterephthalic acid or 1,2-bis-p-carboryphenoxyethane (optionally with a monocarboxylic acid, such as pivalic acid) with one or more glycols, particularly aliphatic glycols, eg ethylene glycol, 1,3- propanediol, 1,4- butanediol, neopentyl glycol and 1,4-cyclohexanedimethanol. A polyethylene naphthalate, and particularly a polyethylene terephthalate film is preferred, especially such a film which has been biaxially oriented by sequential stretching in two mutually perpendicular directions, typically at a temperature in the range 70° to 125° C., and preferably heat set, typically at a temperature in the range 150° to 250° C., for example as described in British Patent GB-A-838708.

The thickness of the substrate of a medium according to the invention my vary over a wide range, but generally will be up to 300, especially from 2 to 75 μm.

The substrate may require a surface treatments or provision of a subbing or receptive layer in order to improve adhesion of the back coat layer and or the recording layer to the substrate.

For optical recording media applications, the substrate is coated with or presents a highly reflective layer for example comprising aluminum, on its obverse side. Typically there is a smoothing layer provided between the substrate and the reflective layer. The recording layer conventionally comprises a mixture of a dye, for example as disclosed in our prior U.S. Pat. No. 4,606,859, and a polymer for example an amorphous polyester thermoplastic resin. The nature of the recording layer as regards the super coat is not critical if a super coat is not to be adsorbed onto it and consequently, any suitable optical recording media recording layer material may be employed as desired. Where a super coat is to be adsorbed onto the recording layer, in addition to the functions required of the recording layer for recording information, the recording layer comprises a material which provides free functional groups which may combine with those of the super coat material.

Where an adsorbed super coat is provided on the back coat and not the recording layer, the recording layer may be protected by a conventional over coat. The over coat layer is preferably composed of an organic material: such organic material may be a cross-linked plastics material which may be thermally or radiation curable. We do not, however, exclude the possibility that the over coat may be composed of an inorganic material or a composite of an organic and inorganic material. Suitable materials are readily apparent to the skilled man and include for example uv and electron beam curable urethane acrylates, epoxy acrylates and polyester acrylates.

One or more of the layers of a media according to the invention may conveniently contain any of the additives conventionally employed in the manufacture of recording media. Thus, agents such as anti-static agents, dyes, pigments, voiding agents, lubricants, anti-oxidants, anti-blocking agents, surface active agents, slip aids, ultra-violet light stabilisers, viscosity modifiers and dispersion stabilisers may be incorporated in the substrate and/or other layer(s) as appropriate.

The back coat and recording layers, and any other layers other than the super coat, may be applied using techniques which are known to the skilled man including those methods herein before described in relation to the super coat.

The invention is illustrated by reference to the accompanying drawings in which.

Figure 1:
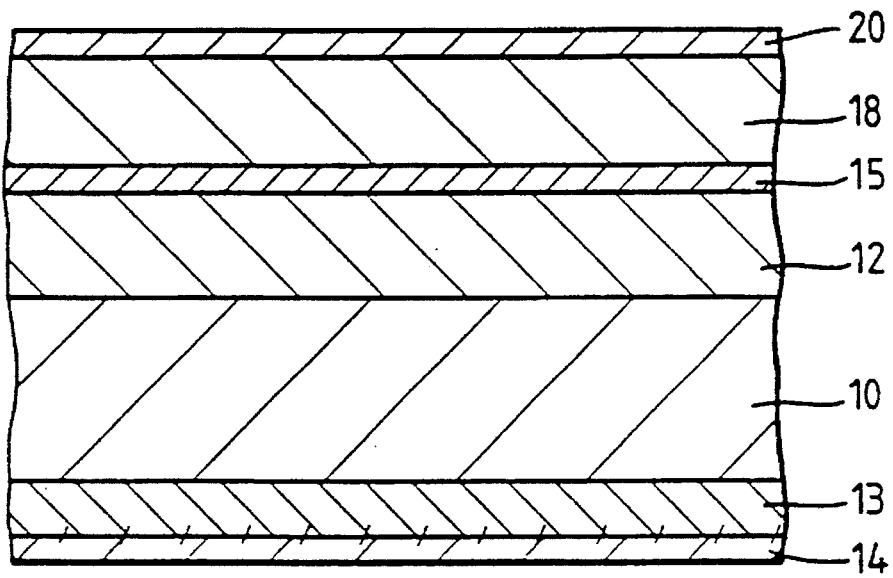
FIG. 1 is a diagrammatic sectional view through an optical recording medium having a back coat as an underlying layer to a super coat;.

Referring to FIG. 1, the optical recording medium illustrated is in a form suitable for use as a flexible optical tape. However, it will be appreciated that the present invention is not limited to media of the optical tape type as shown in FIG. 1. The medium comprises a flexible substrate 10 which is coated on one face with a subbing or smoothing layer 12. The reverse face of the substrate is coated with a backcoat 13 which, may incorporate inorganic filler particles, such as alumina, so as to impart a surface relief to the reverse side of the substrate. A super coat 14 is adsorbed onto the back coat 13 to provide for excellent bonding between the two layers and to provide a low surface energy for the reverse side of the medium. A thin layer 15 of material, e.g. a suitable metal, is applied to the smooth surface of the subbing layer 12 to provide a surface which is highly reflective with respect to the wavelength used for writing into and reading from the medium. An amorphous recording layer 18 of a dye combined with a thermoplastic binder is solvent coated over the reflecting layer 15. A number of suitable dyes for use in the recording layer 18 are disclosed in our prior U.S. Pat. No. 4,606,859. The binder is typically an amorphous polyester thermoplastic resin. An overcoat layer 20 is superimposed on the recording layer 18, the overcoat layer being of a material which is highly transmissive to the laser radiation used for writing and reading the medium and which will be compatible with the reverse side of the substrate and may also serve to protect the recording layer from the environment and from damage by for example abrasion. The substrate 10 may comprise for example a 75 micron or less thick film of Melinex which is a biaxially orientated polyethylene terepbthalate film (Melinex is a Registered Trade Mark of Imperial Chemical Industries PLC) and has sufficient flexibility to function, when coated with the layers 12, 15, 18 and 20, as a flexible optical tape medium which may be wound up on a spool in a similar manner to magnetic tape media. The dye is selected so as to have an absorption peak slightly shifted away from the reading and writing wavelength, typically 830 nm. The overcoat layer is typically composed of tough and hard material such as a radiation cured urethane acrylate or epoxy acrylate.

The recording medium shown in FIG. 1 is intended to be written into and read back using conventional techniques involving moving the medium relative to an optical recording head operable in writing or reading modes using a laser beam adjusted to higher or lower power levels according to the mode of operation, recording being effected with increased power and read back with reduced power. The laser beam is focused onto the recording layer 18 through the overcoat layer 20. Information may be represented digitally by using pit length (ie. the length of the pit in the direction of relative movement between the recording head and the medium) or pit position to store binary information and the information is read back by applying threshold techniques to detect the reflectivity variations caused by the presence of the pits.

In accordance with the invention, the super coat has a low surface energy such that there is a reduced tendency for the super coat and over coat to adhere when the tape is wound onto a spool.

Figure 2:
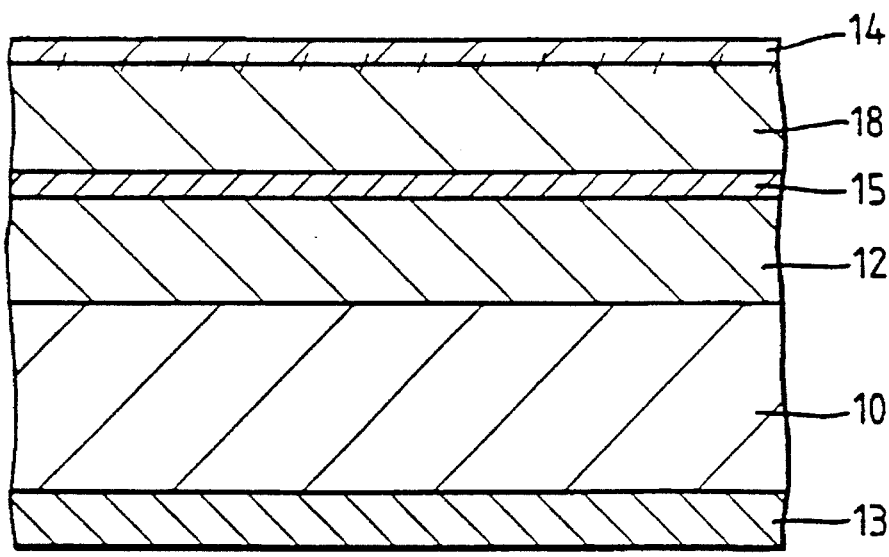
FIG. 2 is a diagrammatic sectional view through an optical recording medium having a recording layer as an underlying layer to a super coat.

FIG. 2 shows an optical tape medium similar to that illustrated in FIG. 1 except that the super coat 14 is adsorbed onto the recording layer 18 and in addition to providing the function of the low energy adsorbed super coat, also provides the function of the over coat as described in FIG. 1. The back coat 13 does not have a super coat in this embodiment and the super cost 14 on the recording layer 18 comes into contact with the back coat 13 when the tape is wound onto a spool.

Figure 3:
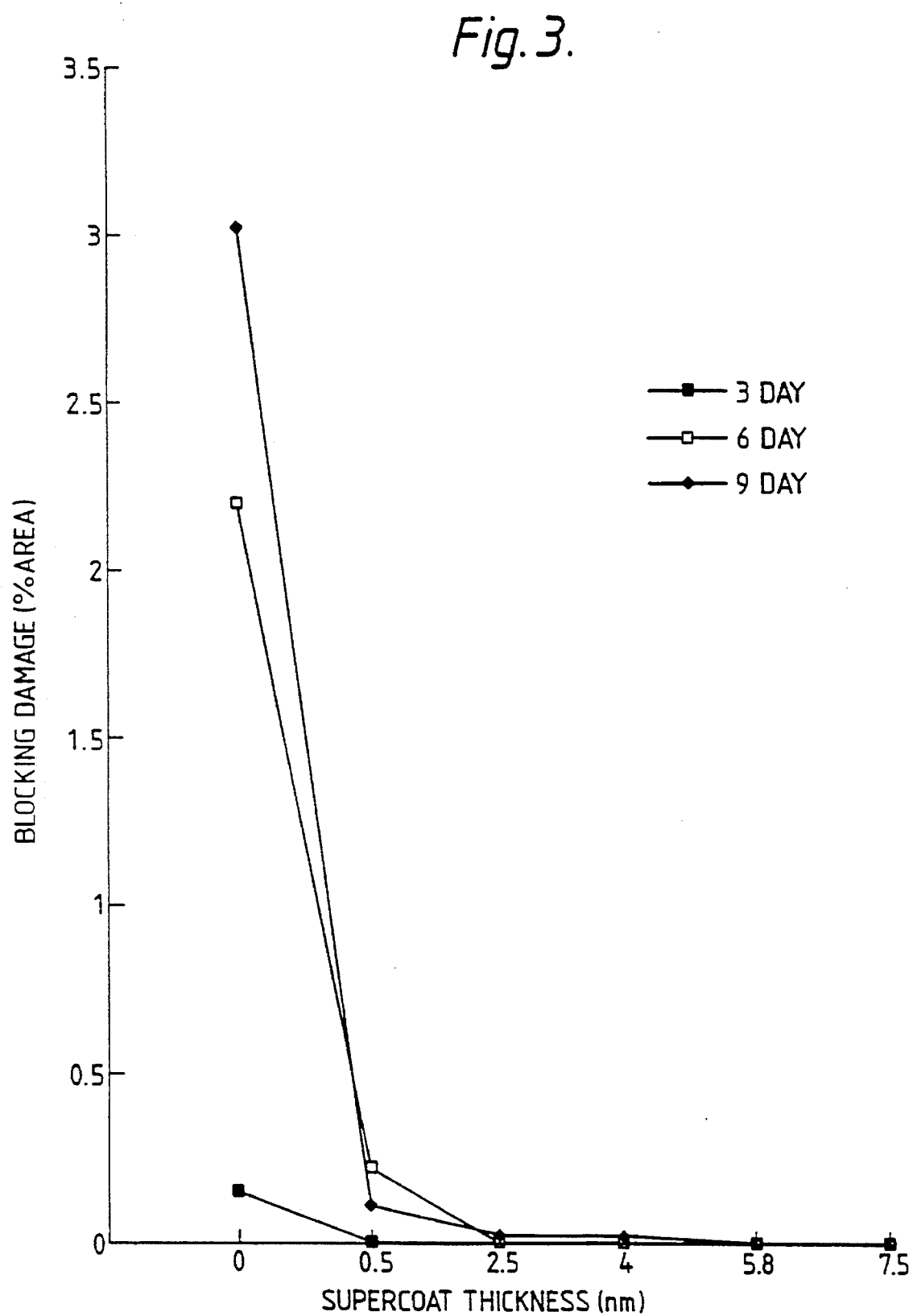
FIG 3 is a graph of test results showing the effect of the thickness of the super coat.

The invention is further illustrated by the following non-limiting Examples and FIG. 3 which is a graph of test results showing the effect of the thickness of the super coat.

EXAMPLE 1 (COMPARATIVE)

A polyethylene terephthalate film was melt extruded, cast onto a cooled rotating drum and stretched in the direction of extrusion to approximately 3 times its original dimensions. The cooled stretched film was then coated on both surfaces with an aqueous receptive layer composition containing the following components:

| | |
|---|---|
| Acrylic resin<br>(16% w/w aqueous based latex of methyl methacrylate/ethyl acrylate/methacrylamide: 46/46/8 mole %, with 25% by weight | 3.125 liters |

| | |
|---|---|
| -continued | |
| methoxylated melamine-formaldehyde) | |
| Ludox TM | 0.43 liters |
| (50% w/w aqueous silica slurry of average particle size approximately 20 nm, supplied by Du Pont) | |
| Ammonium nitrate | 0.20 liters |
| (10% w/w aqueous solution) | |

The receptive layer coated film was passed into a stenter oven, where the film was dried and stretched in the sideways direction to approximately 3 times its original dimensions. The biaxially stretched coated film was 75 μm thick and had a dry coat weight of 0.3 mgdm$^{-3}$.

One side of the film was coated by "bead" meniscus coating with a back coat composition containing the following components;

| | Composition (% w/w) |
|---|---|
| Plex 6696-0 | 4.25 |
| Sartomer 399 | 4.25 |
| Zinc diacrylate | 1.50 |
| Irgacure 907 | 0.70 |
| Methanol | 89.3 |
| Total % w/w | 10.7 |

The applied wet coating was approximately 12 μm thick and was dried in an oven at 100° C. for a period of 20 seconds. The dried coating was partly cured to leave approximately 25% of the acrylate groups as free functional groups by one pass of the film at 30 mpm under a pair of focused 118 W/cm (300 W/inch) UV lamps (microwave generated type H bulb Fusion Systems) in a nitrogen purged atmosphere. The amount of curing was determined by monitoring the intensity of the infra red absorbance of the olefinic bond of the acrylate groups.

The film was then treated on the opposite side of the film. The film was sputter coated with an aluminum alloy to form a reflective surface on the receptive layer. This surface was then coated with a dye/binder recording layer and then a sub-micron transparent protective thin overcoat layer. A sample of this material was retained for use in comparative tests.

EXAMPLE 2

A recording medium was produced according to Example 1 (comparative) and was then coated on its back coat using the bead (meniscus) coating technique with a composition containing the super coat material of the following composition (% w/w);

| | |
|---|---|
| TEGOMER RC726 | 0.0184 |
| (a silicone acrylate from T H Goldschmidt) | |
| IRGACURE 907 | 0.0013 |
| (Ciba Geigy) | |
| Methyl Ethyl Ketone | to 100 |

The coating was dried by air impingement to remove the solvent for about 15 seconds at a temperature of 125° C. The dried coating was then exposed to two 125W/cm uv lamps (Fusion Systems Type H) at 30 mpm in a nitrogen purged atmosphere to cure the super coat and effect bond formation with the free functional groups of the back coat. The super coat was coated to provide a nominal cured thickness of 2.5 nm.

EXAMPLE 3

A further recording material was produced according to Example 1 (Comparative) and was then coated on its back coat using a wire wound rod to give a wet coating thickness of 12 μm with a super coat material of the following composition (% w/w):

| | |
|---|---|
| Perfluorooctyl acrylate | 0.020 |
| (MTM Research Chemicals Inc) | |
| IRGACURE 907 | 0.0014 |
| Hexane | to 100 |

The resulting coating was dried in an oven at 120° C. for a period of approximately 30 seconds and then exposed to a 80 W/cm medium pressure mercury arc lamp (Primarc Mini-cure unit) in a nitrogen atmosphere at a speed of 7 mpm. The final cured super coat had a nominal thickness of 2.5 nm.

EXAMPLE 4

The recording media produced in Examples 1 (comparative) and 2 and 3 were tested as follows:

Surface Energy

This characteristic was determined in accordance with ASTM Test No. D2578-67. The surface energy of each sample was measured before and after immersion in a solvent for 16 hours. The results are shown below (dyne/cm).

| | Example 1 (comparative) | Example 2 | Example 3 |
|---|---|---|---|
| pre immersion | 54–58 | <32 | <28 |
| after 16 hrs: | | | |
| methylethylketone | 54–58 | <32 | <28 |
| hexane | 54–58 | <32 | <28 |

The results show that media according to the invention have a reduced energy super coat and that the super coat is adsorbed onto the back coat.

Blocking Evaluation (Transfer of Obverse side to Reverse side)

This test simulates the conditions under which recording media my be stored on a spool. Two samples of media were placed in together with the obverse side of one sample in contact with the reverse side of the second sample. A polyester terephthalate film as produced according to Example 1 (comparative) having the dimensions 830 m×35 mm×75 μm was then rolled onto a spool and the samples were placed on the polyester tape such that the samples were 50 m from the core of the tape. This assembly was then subjected to accelerated ageing conditions of 45° C. at 60% relative humidity for 6 days. Following the ageing process, the obverse side of the sample having its obverse side (recording layer and over coat) in contact with the reverse side of the other sample was analyzed using an Image Analyser by measuring reflectivity of the obverse side of the sample.

This test was performed for media produced in Example 1 (comparative) and Examples 2 and 3. There was a small amount of damage to the obverse side of the sample of Example 1 (comparative) but no detectable damage to the obverse side of the sample of Examples 2 and 3 which demonstrated that there was improved blocking performance, that is, there was no detectable removal of the obverse side onto the reverse side of the sample during the test.

Super Coat Transfer to the Obverse Side of the Sample

The blocking evaluation test was repeated except that the samples were aged for 9 days instead of 6 days. A scanning electron microscope using an EDX technique was used to determine whether any super coat material had been transferred to the obverse side of the sample during the ageing process by scanning the obverse side of the sample. Samples of Examples 2 and 3 did not show any detectable signs of transfer of the super coat to the obverse side. This test demonstrates that the super coat is not susceptible to transfer to the obverse side of recording media according to the present invention.

EXAMPLE 5

A further recording material was produced according to Example 1 (Comparative).

The protective overcoat consisted of

| % w/w | Material |
|---|---|
| 0.35 | EBECRYL 220— a hexafunctional urethane acrylate |
| 0.12 | EBERCRYL 210— a difuncational urethane acrylate |
| 0.02 | UVECRYL p115— an amino acrylate |
| | (all from UCB) |
| 5.90 | diacetone alcohol |
| 19.80 | acetone |
| 73.77 | tetrahydrofuran | and was applied to the recording layer by meniscus coating. After drying in an oven for approximately 60 seconds at a temperature of 80° C., the coating was partly cured to leave approximately 45% of the acrylate groups as free functional groups by one pass at 10mpm under a pair of focussed 118 W/cm uv lamps(microwave generated type H bulb Fusion Systems) in a nitrogen purged atmosphere.

A super coat having the composition

| % w/w | Material |
|---|---|
| 0.020 | TEGOMER RC726 |
| 0.0014 | IRGACURE 907 |
| 99.9786 | Hexane | was applied and cured under the same conditions as given in Example 3.

The surface energy and blocking performance was similar to Example 3.

EXAMPLE 6

Samples of recording medium produced in accordance with Example 2 but with different thicknesses of super coat and samples of recording medium produced in accordance with Example 1 (Comparative) were tested for blocking damage after 3,6 and 9 days using the method set out in Example 4 with the Image Analyser programmed to calculate the percentage of the obverse side (recording layer and overcoat) removed. The results are shown in FIG. 3.

I claim:

1. An optical recording medium for use with a laser recording beam of a given wavelength comprising a substrate having on its obverse side a recording layer which is capable of absorbing radiation of said given wavelength, a back coat on the reverse side of the substrate and a super coat on the side of the back coat away from the substrate.

2. A recording medium comprising a substrate having on its obverse side a recording layer and on its reverse side, a back coat at least one of which layers is an underlying layer to a super coat, and a super coat on at least one side of the medium wherein the super coat is adsorbed onto the underlying layer.

3. A recording medium comprising a substrate having on its obverse side a recording layer, on its reverse side, a back coat layer at least one of which layers is an underlying layer no a super coat, and on at least one side of the medium a super coat having a surface energy of not more than 44 dyne per centimeter (dyne/cm) wherein the super coat is adsorbed onto the underlying layer.

4. A recording medium comprising a substrate having on its obverse side a recording layer and on the reverse side a back coat layer, an least one of which layers is the underlying layer of a super coat, and a super coat on at least one side of the medium wherein the underlying layer comprises a material having free functional groups and the super coat is formed on the underlying layer from a composition comprising a material, which is to form the super coat, having free functional groups which groups are compatible with at least some of those of the underlying layer, wherein, upon or subsequent to formation of the super coat, at least some of the free functional groups of the underlying layer and super coat combine whereby the super coat is adsorbed onto the underlying layer.

5. A method of producing a recording medium which comprises providing a base medium comprising a substrate having on its obverse side a recording layer and on the reverse side a back coat layer, applying to at least one of said layers a composition comprising a super coat material having free functional groups to form a super coat wherein the layer to which said composition is applied comprises a material having free functional groups which are compatible with the functional groups of the super coat material, and effecting curing of the super coat to form an adsorbed super coat on the said base medium.

6. In a method of optically recording using an optical recording medium and a laser recording beam having a given wavelength, and using, as the recording medium, a medium according to claim 1.

\* \* \* \* \*